(12) United States Patent  (10) Patent No.: US 9,296,103 B2
Iwatake  (45) Date of Patent: Mar. 29, 2016

(54) CONTROL DEVICE FOR ROBOT FOR CONVEYING WORKPIECE

(71) Applicant: FANUC CORPORATION, Minamitsuru-gun, Yamanashi (JP)

(72) Inventor: Takahiro Iwatake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 4 days.

(21) Appl. No.: 14/255,065

(22) Filed: Apr. 17, 2014

(65) Prior Publication Data

US 2014/0316572 A1  Oct. 23, 2014

(30) Foreign Application Priority Data

Apr. 18, 2013  (JP) .................................. 2013-087408

(51) Int. Cl.
*B25J 9/16* (2006.01)
(52) U.S. Cl.
CPC ..................................... *B25J 9/1633* (2013.01)
(58) Field of Classification Search
CPC .............. B25J 9/1628–9/1653; B25J 15/0004; B25J 18/02–18/028; B65G 47/905; B65G 1/137; B65G 1/917; B65G 65/005; G05D 2201/0216
See application file for complete search history.

(56) References Cited

U.S. PATENT DOCUMENTS 8,074,431 B1 * 12/2011 Pierson et al. .................. 53/529
2013/0085604 A1 * 4/2013 Irie et al. ....................... 700/258

FOREIGN PATENT DOCUMENTS

| DE | 112011103794 T5 | 10/2013 |
|---|---|---|
| JP | 62152686 A | 7/1987 |
| JP | 355189 A | 3/1991 |
| JP | 5-116081 A | 5/1993 |
| JP | 5-212690 A | 8/1993 |
| JP | 5-241626 A | 9/1993 |
| JP | 6043036 B2 * | 6/1994 |
| JP | 7-205075 A | 8/1995 |
| JP | 2515594 B2 * | 7/1996 |
| JP | 9225761 A | 9/1997 |
| JP | 2000-263481 A | 9/2000 |
| JP | 2004-249391 A | 9/2004 |
| JP | 3925020 B2 | 6/2007 |
| JP | 2011-183537 A | 9/2011 |
| JP | 2011-201007 A | 10/2011 |

(Continued)

OTHER PUBLICATIONS

Office Action mailed Aug. 19, 2014, corresponding to Japanese patent application No. 2013-087408.

*Primary Examiner* — James Trammell
*Assistant Examiner* — Adam Mott
(74) *Attorney, Agent, or Firm* — Hauptman Ham, LLP

(57) ABSTRACT

A control device for controlling a robot which has a tool for holding a workpiece and a force measuring part for measuring a force acting on the tool. The control device includes a calculating part for calculating a center-of-gravity position of the workpiece, based on force data measured by the force measuring part with a plurality of postures of the robot holding the workpiece, a processing part for performing at least one of a process for estimating a holding state of the workpiece, a process for determining a type of the workpiece, and a process for testing a quality of the workpiece, based on the position of the tool and the center-of-gravity position of the workpiece, and an operating command modifying part for modifying an operating command to the robot, based on a result of the process performed by the processing part.

9 Claims, 9 Drawing Sheets

(56) References Cited

FOREIGN PATENT DOCUMENTS

| JP | 2011235374 A | 11/2011 |
|----|--------------|---------|
| JP | 2012-40634 A | 3/2012  |
| JP | 2012250334 A | 12/2012 |

* cited by examiner (a)

(b)

(c)

(a)

(b)

(c)

(d)

(a)

(b)

(c)

CONTROL DEVICE FOR ROBOT FOR CONVEYING WORKPIECE

RELATED APPLICATIONS

The present application claims priority to Japanese Application Number 2013-087408, filed Apr. 18, 2013, the disclosure of which is hereby incorporated by reference herein in its entirety.

BACKGROUND OF THE INVENTION

1. Field of the Invention

The present invention relates to a control device of a robot for picking out and conveying a workpiece.

2. Description of the Related Art

A known robot system includes a robot used for picking out randomly-placed workpieces with a tool, and conveying a picked out workpiece to a predetermined position. In such a robot system, in the case where a position and posture of a workpiece to be picked out are not precisely recognized, the position and posture of the workpiece are not specified, and therefore, a positional relationship between the workpiece and the tool cannot be determined at the time of holding the workpiece by the tool. More specifically, in the case where a workpiece is held in an unspecified manner or a randomly-placed workpiece is held at a portion which is easy to pick up, a portion of the workpiece held by the tool may be changed every time. In addition, a posture of the workpiece relative to the tool may be changed every time when the workpiece is held by the tool. As well as these cases, in the case where a position of the center of gravity of the workpiece is unknown even when the position and posture of the workpiece are recognized, it may be impossible to ensure a desired positional relationship between the tool and the center of gravity of the workpiece when the workpiece is held.

Therefore, a workpiece may be held at a portion of the workpiece distant from its center of gravity, or in an unstable posture. In these cases, the workpiece is not stably held. Therefore, a portion of the workpiece held by the tool may be relatively moved, changing a holding state of the workpiece during the conveyance. The workpiece may fall during the conveyance, damaging peripheral devices. These may require operation of the robot system to be suspended, or put workers in a dangerous situation.

Since a positional relationship between the tool and the workpiece is not determined, it may be necessary to know a longitudinal direction of the workpiece or the posture of the workpiece. If the workpiece has a plurality of faces that can be held by the tool, it may be impossible to know which face of the workpiece is actually held by the tool. In these cases, an additional process may be required to detect a portion of the workpiece being held, or a posture of the workpiece, by using a visual sensor. Further, since a position of the workpiece relative to the tool is unknown, an additional process may be required to put the workpiece at another site and hold the workpiece again after the posture of the workpiece is detected by the visual sensor.

Furthermore, in the case where there are a plurality of types of workpieces, or there are defective workpieces or unexpectedly different workpieces, or in the case where the workpiece is fragile, an additional inspection process may be required to check the type of the workpiece or a quality of the workpiece. When a workpiece is picked out from randomly-placed workpieces, a large number of workpieces must be picked out. As a result, increased cycle time and increased cost may be required to pick up and convey the workpiece to a certain position.

JP-A-2011-183537 discloses the related art which involves checking a holding state of a workpiece and holding the workpiece again in another posture as necessary. JP-A-5-212690 discloses the related art which involves measuring a workpiece being held, and determining whether or not the workpiece matches a predetermined type. JP-A-5-241626, JP-A-2004-249391 and JP-A-2011-201007 disclose the related art which involves correcting the posture of the workpiece relative to the tool with the aid of a visual sensor. JP-B-3925020 discloses the related art which involves controlling the robot so as to move the workpiece closer to the center of the container when the robot fails to pick out the workpiece. JP-A-2000-263481 discloses the related art which involves suspending the picking out process to retract the robot when an abnormality is detected at the time of picking out a workpiece. JP-A-5-116081, JP-A-2012-40634 and JP-A-7-205075 disclose a method for calculating a weight and a position of center of gravity of a workpiece, and a direction of a gravity force acting on the workpiece for the purpose of compensating an influence of a gravity force acting to a force acting between the workpiece and the tool.

In the known related art described above, if it is determined that a workpiece is unstably held, it is necessary to place the workpiece at another site to check a position and posture of the workpiece by a checking device. Thereafter, based on the checking result, the workpiece is held again in an appropriate posture. However, in some cases, during the process of checking, the workpiece may fall, possibly damaging the checking device. In addition, with use of such a checking device, not only does it take more time to complete the process, but also results in increased cost or requires a large space. Consequently, the increased cycle time and the increased cost cannot be avoided with the checking device. Further the checking device is not designed to obtain the actual weight of the workpiece, the position of its center of gravity, and data of a force while holding the workpiece. Therefore, it is difficult to determine how stable the workpiece is during the conveyance.

In some cases, when it is difficult to determine the type or quality of a workpiece from its appearance, it may be desirable to easily determine the type or quality of the workpiece during the conveyance.

Therefore, there is a need for a robot system, in which estimation of a holding state of the workpiece, determination of the type of the workpiece, and a test for checking a quality of the workpiece can be easily carried out, in order to selectively implement operation as necessary, depending on a particular condition of the workpiece. In this connection, the holding state of the workpiece may include stability of the workpiece held by the tool, the position and posture of the work, or which face of the workpiece is held by the tool.

SUMMARY OF THE INVENTION

According to a first aspect of the present invention, a control device for a robot, the robot comprising a tool for holding a workpiece, and a force measuring part for measuring a force acting on the tool from the workpiece when the workpiece is held by the tool, the robot being adapted to hold and convey the workpiece placed in a three-dimensional space, wherein the control device comprises: a center-of-gravity position calculating part for calculating a center-of-gravity position of the workpiece held by the tool when the robot holds and conveys the workpiece, based on force data measured by the force measuring part with a plurality of postures of the robot holding the workpiece; a processing part for carrying out at least one of an estimation process for estimating a holding state of the workpiece held by the tool, a determination process for determining a type of the workpiece held by the tool, and a testing process for testing a quality of the workpiece held by the tool, based on a positional relationship between the position of the tool and the center-of-gravity position of the workpiece; and an operating command modifying part for modifying an operating command to the robot, based on a result of process carried out by the processing part, is provided.

According to a second aspect of the present invention, the control device according to the first aspect, wherein the center-of-gravity position calculating part further comprises a weight obtaining part for obtaining a weight of the workpiece, wherein the processing part is adapted to carry out at least one of the estimation process for estimating a holding state of the workpiece held by the tool, the determination process for determining a type of the workpiece held by the tool, and the testing process for testing a quality of the workpiece held by the tool, based on the positional relationship between the position of the tool and the center-of-gravity position of the workpiece and on the weight of the workpiece, is provided.

According to a third aspect of the present invention, the control device according to the first aspect, wherein the processing part is adapted to estimate the holding state of the workpiece by determining a posture of a predetermined axis of the workpiece relative to the tool, based on a holding manner for holding the workpiece by the tool and on a positional relationship between the position of the tool and the center-of-gravity position of the workpiece, is provided.

According to a fourth aspect of the present invention, the control device according to the first aspect, wherein the tool is adapted to hold the workpiece by attracting a surface of the workpiece, and wherein the control device further comprises: a shortest distance storing part for storing a shortest distance from planes on the surface of the workpiece which can be held by the tool to the center-of-gravity position of the workpiece; and a shortest distance obtaining part for obtaining the shortest distance from planes on the surface of the workpiece to the center-of-gravity position of the workpiece, based on a position and posture of the surface of the workpiece held by the tool, wherein the processing part is adapted to estimate the face of the workpiece held by the tool, by comparing the shortest distance stored by the shortest distance storing part with the shortest distance obtained by the shortest distance obtaining part, is provided.

According to a fifth aspect of the present invention, the control device according to any one of the first to fourth aspects, wherein the operating command modifying part is adapted to change a moving speed of the robot at the time of conveying the workpiece, based on a result of the estimation process for estimating a holding state of the workpiece carried out by the processing part, is provided.

According to a sixth aspect of the present invention, the control device according to any one of the first to fourth aspects, wherein the operating command modifying part makes the robot operate so as to place the workpiece within a predetermined area distant from the position where the workpiece is positioned before held by the tool, or move the workpiece to a position where the workpiece can be temporarily released and held again, based on a result of the estimation process for estimating a holding state of the workpiece carried out by the processing part, is provided.

According to a seventh aspect of the present invention, the control device according to any one of the first to fourth aspects, wherein the operating command modifying part makes the robot operate so as to change a position or posture of the workpiece at the time of conveying the workpiece, based on a result of the estimation process for estimating the holding state of the workpiece carried out by the processing part, is provided.

According to an eighth aspect of the present invention, the control device according to any one of the first to fourth aspects, wherein the control device is adapted to cooperate with a measuring device which is adapted to measure a position and posture of the workpiece, wherein the operating command modifying part makes the robot operate so as to move the workpiece to a position where the workpiece can be measured by the measuring device by correcting a position and posture of the workpiece, based on a result of the estimation process for estimating the holding state of the workpiece carried out by the processing part, and wherein the control device further comprises a holding position correcting part adapted to cooperate with the measuring device to correct a holding position and posture of the workpiece, is provided.

According to a ninth aspect of the present invention, the control device according to any one of the first to fourth aspects, wherein the operating command modifying part makes the robot operate so that the center-of-gravity position of the workpiece is within a predetermined area defined at a position to which the workpiece is conveyed, based on the center-of-gravity position of the workpiece calculated by the center-of-gravity position calculating part, is provided.

These and other objects, features and advantages of the present invention will become more apparent in light of the detailed description of exemplary embodiments thereof as illustrated by the drawings.

DETAILED DESCRIPTION OF THE INVENTION

Figure 1:
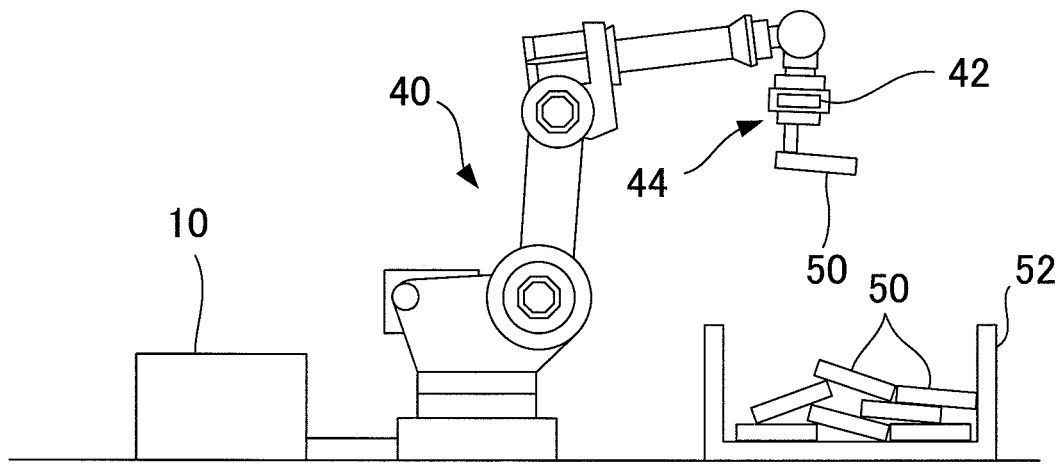
FIG. 1 schematically shows an exemplary configuration of a robot system including a robot controlled by a control device according to one embodiment of the present invention.

Referring to the accompanying drawings, embodiments of the present invention will be explained below. In the following descriptions, force includes moment of force as well as force itself, unless mentioned otherwise. FIG. 1 schematically shows an exemplary configuration of a robot system including a robot controlled by a control device 10 according to one embodiment of the present invention. Although the robot 40 shown in the drawing is a six-axis robot, the present invention can be applied to any known robot 40 having other configuration. Each drive shaft of the robot 40 is controlled by the control device 10, thereby positioning a tip portion of the robot arm in place in a three-dimensional space. The control device 10 has a hardware configuration, such as CPU, ROM and RAM, and is designed to perform various processes as described below.

The robot 40 is used to successively pick out workpieces 50 randomly placed in a container 52, and move them to a predetermined site such as a conveyer or a working table. The workpieces 50 are randomly stacked in the form of bulk, or are put in an unspecified manner. Therefore, when the workpiece is held, a positional relationship between the tool and the center of gravity of the workpiece cannot be ensured as desired. The robot 40 is provided with a six-axis force sensor 42 as a force measuring part at a tip portion of the arm. To the force sensor 42, the tool 44 having a pneumatic sucking pad is attached. The tool 44 is designed to hold the workpiece 50 by attracting the workpiece 50 with negative pressure. The force sensor 42 is designed to measure a force acting on the tool 44 when the workpiece 50 is held by the tool 44.

As long as the tool 44 can hold the workpiece 50, the tool 44 may have any other configuration. For example, the tool may have a configuration in which the workpiece 50 is held by two claws subject to opening and closing movement. Alternatively, the tool may include an electromagnet for generating an attractive force on the workpiece 50. Instead of the force sensor 42, a force acting on the tool 44 may be indirectly obtained by estimating it based on an electric current supplied to electric motors for driving the respective joints of the robot 40. Alternatively, a force acting on the tool 44 may be measured by the force sensor attached to the tool 44. In the case where the robot 40 has a force measuring part in order to prevent collision, detect an overload, monitor a force or perform a force control, the force measuring part may be used instead of the force sensor 42.

Figure 2:
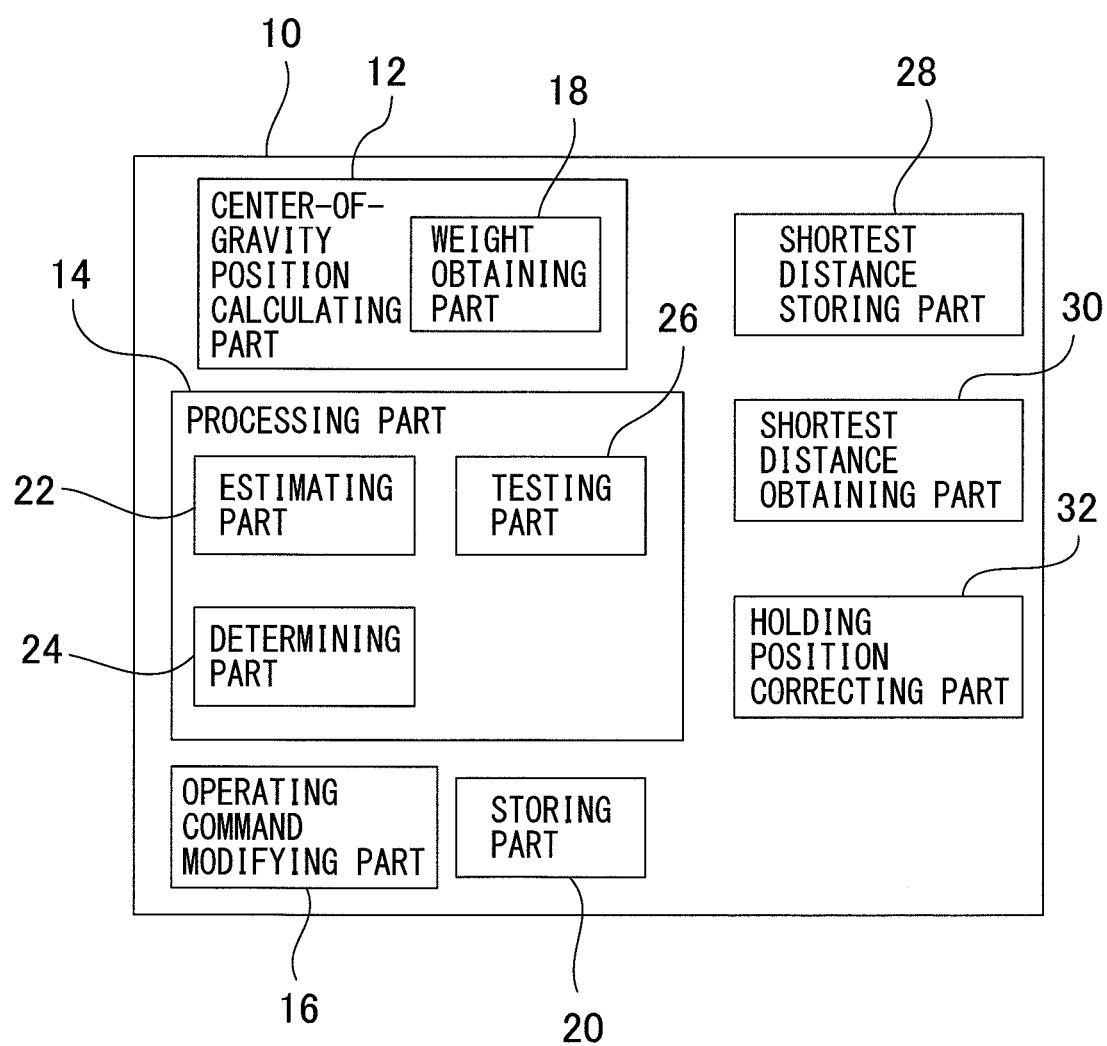
FIG. 2 shows a functional configuration of the control device according to the embodiment.

FIG. 2 shows a functional configuration of the control device 10 according to the embodiment. The control device 10 includes a center-of-gravity position calculating part 12, a processing part 14, an operating command modifying part 16, a weight obtaining part 18, a storing part 20, a shortest distance storing part 28, a shortest distance obtaining part 30, and a holding position correcting part 32.

The center-of-gravity position calculating part 12 calculates a position of the center of gravity of the workpiece 50 held by the tool 44, based on force data measured by the force sensor 42 with a plurality of different postures of the robot 40. The force data measured by the force sensor 42 contains data of a force and a moment of force. In this specification, the center-of-gravity position represents a position of the center of mass. An exemplary process for calculating the center-of-gravity position will be described in detail below. The processing part 14 further includes an estimating part 22, a determining part 24 and a testing part 26. The estimating part 22 estimates a holding state of the workpiece 50, based on the center-of-gravity position of the workpiece 50 relative to the tool 44. The determining part 24 determines the type of the workpiece 50, based on the center-of-gravity position of the workpiece 50 relative to the tool 44. The testing part 26 tests the workpiece as to whether or not it is an intended object, based on the center-of-gravity position of the workpiece 50 relative to the tool 44. For example, it is determined as to whether or not the workpiece is in a different state from the intended one, whether or not the workpiece is defective, whether or not the workpiece is a different type from the intended one, or whether or not the workpiece is damaged.

The processing part 14 may selectively activate at least one of the estimating part 22, the determining part 24, and the testing part 26.

The operating command modifying part 16 modifies an operating command given to the robot 40, based on the result of the process carried out by the processing part 14. The weight obtaining part 18 obtains a weight of the workpiece 50. The storing part 20 stores a teaching program, an operating program, the calculated center-of-gravity position of the workpiece 50, the weight of the workpiece 50, parameters needed for various calculations and results of the calculations, or the like.

The shortest distance storing part 28 stores the shortest distance from each face of the workpiece 50 to the center-of-gravity position of the workpiece 50. The shortest distance obtaining part 30 calculates the shortest distance from the holding face of the workpiece 50 to the center-of-gravity position of the workpiece 50. As described below, the shortest distance storing part 28 and the shortest distance obtaining part 30 are used to determine as to which face of the workpiece 50 is held by the tool 44.

The holding position correcting part 32 is designed to correct or detect the holding position and posture of the workpiece obtained by detecting the workpiece with a visual sensor or the like, so as to match an actual position and posture of the workpiece.

Figure 11:
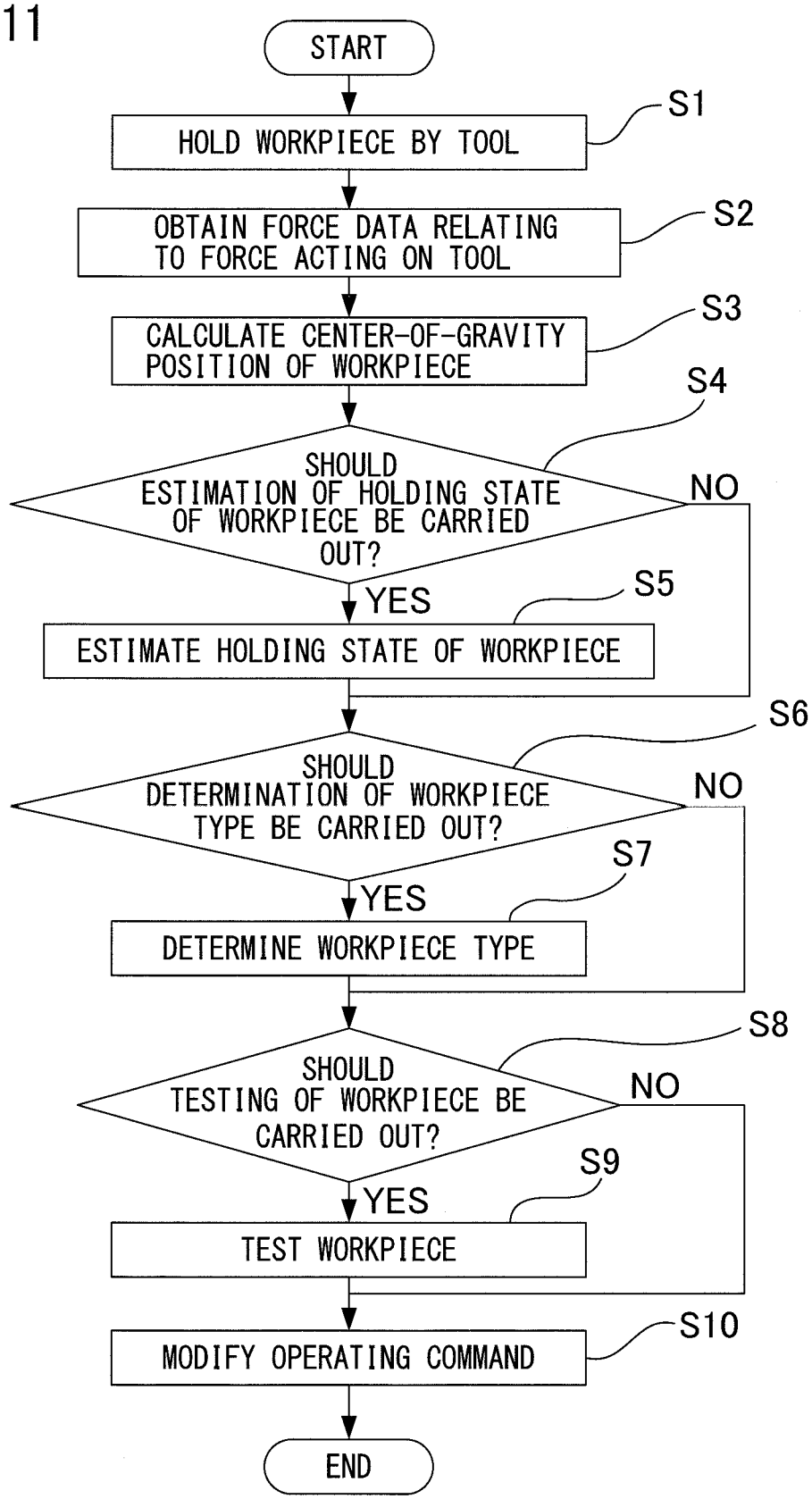
FIG. 11 is a flowchart showing processes carried out by a control device of one embodiment of the present invention.

An exemplary process of the control device 10 according to the present embodiment will be explained with reference to FIG. 11. FIG. 11 is a flowchart showing a process carried out by the control device 10. In this connection, a series of processes are described below only by way of example, and therefore, it should be noted that the present invention is not limited to the specific example.

Once the picking-out process and the conveying processing of the workpiece 50 begin, an operating command is sent from the control device 10 to the robot 40. In response to the operating command, the robot 40 moves the tool 44 attached to the tip portion of the robot 40, into the container 52. The tool 44 performs a holding operation to hold the workpiece 50 (step S1). While postures of the workpiece 50 are changed with the workpiece 50 held by the tool 44, data of a force acting from the workpiece 50 to the tool 44 is obtained by the force sensor 42 (step S2). The force data includes a force and a moment of force associated with a plurality of postures of the robot 40. The obtained force data is stored in the storing part 20 of the control device 10, for example.

At step S3, the center-of-gravity position calculating part 12 of the control device 10 calculates a center-of-gravity position of the workpiece 50, based on the force data obtained with a plurality of postures of the robot 40 at step S2. Positions and postures of the robot 40 and the tool 44 are calculated by a position detecting device such as an encoder attached to each drive shaft of the robot 40.

The processing part 14 activates at least one of the estimating part 22, the determining part 24 and the testing part 26 to carry out processes at steps S4 to S9. An operator may choose, for example, with a teaching control panel, whether or not each process is carried out. In the case where the judgment at step S4 is YES, or in other words, in the case where it is necessary to estimate the holding state of the workpiece 50, the process proceeds to step S5, at which the estimating part 22 estimates the holding state of the workpiece 50. If the judgment at step S4 is NO, the process skips step S5 and proceeds to step S6.

If the judgment at step S6 is YES, or in other words, if it is necessary to determine the type of the workpiece 50, the process proceeds to step S7, at which the determining part 24 determines the type of the workpiece 50. If the judgment at step S6 is NO, the process skips step S7 and proceeds to step S8.

If the judgment at step S8 is YES, or in other words, it is necessary to test a quality of the workpiece 50, the process proceeds to step S9, at which the testing part 26 tests the quality of the workpiece 50. If the judgment at step S8 is NO, the process skips step S9 and proceeds to step S10.

At step S10, The operating command modifying part 16 modifies an operating command to the robot 40, based on the results of the processes carried out by the processing part 14, i.e., the results of the processes carried out by the estimating part 22, the determining part 24 and/or the testing part 26. The robot 40 is controlled in accordance with the modified operating command.

In the following, the processes carried out by the control device 10 according to this embodiment will be described in more detail. To what extent the holding state of the workpiece 50 is stable depends on what portion of the workpiece 50 is held by the tool 44. For example, when the workpiece 50 is held at a position close to its center of gravity, the workpiece 50 is stably held. In this case, a positional relationship between the tool 44 and the workpiece 50 is hardly changed. Accordingly, there is little risk of the workpiece 50 falling during movement of the workpiece. On the other hand, when the workpiece 50 is held at a position distant from the center of gravity of the workpiece 50, there is greater risk of the workpiece 50 falling. In the latter case, the operating command modifying section 16 is activated to selectively carry out the process such as lowering a speed at which the workpiece 50 is moved, or if appropriate, put the workpiece 50 at another site once and then hold the workpiece 50 again at a stable position.

In the case where a change of the force data obtained by the force sensor 42 exceeds a predetermined threshold, it can be assumed that the holding state of the workpiece 50 is not stable. Accordingly, in this case, the operating command modifying part 16 is activated to selectively carry out the process such as lowering a speed at which the workpiece 50 is moved, or holding the workpiece 50 at another position, as necessary.

In the present invention, the holding position of the workpiece 50 represents a position determined in accordance with a predetermined procedure relative to a control point defined for the robot arm of the robot 40. Thus, the holding position of the workpiece 50 is determined for convenience sake. For example, the holding position of the workpiece may be (a) a position of TCP (tool center point: a control point defined for the robot arm) or a position offset from the TCP by a predetermined distance in a predetermined direction, or (b) a position where the tool 44 actually comes in contact with the workpiece 50. In the case of (b), if the tool 44 and the workpiece 50 come in contact with each other at a plurality of contact positions, the contact position may be a position representative of those contact positions. For example, in the case where the tool 44 comes in contact with three positions on the face of the workpiece 50 when the workpiece 50 is held, the holding position of the workpiece may be a position representative of the three contact positions, such as a center of the contact positions (b1). If the tool consists of two claws which are opened and closed to hold the workpiece 50, the holding position of the workpiece may be a position in the middle of the claws (b2), a position offset from the position in the middle of the claws (b3), or a position of TCP defined at one of the claws.

Figure 3:
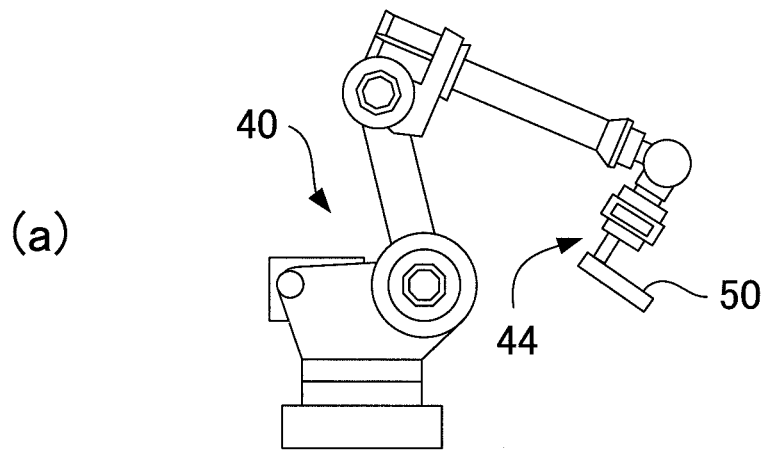
FIG. 3 shows postures of a workpiece in the process of movement.
Figure 3:
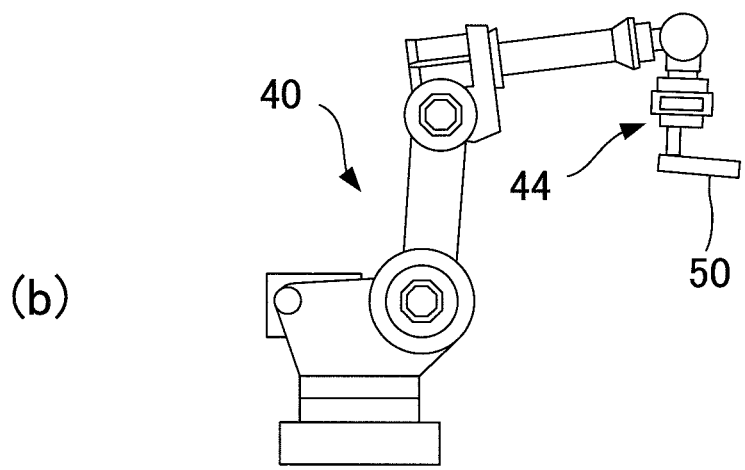
Figure 3:
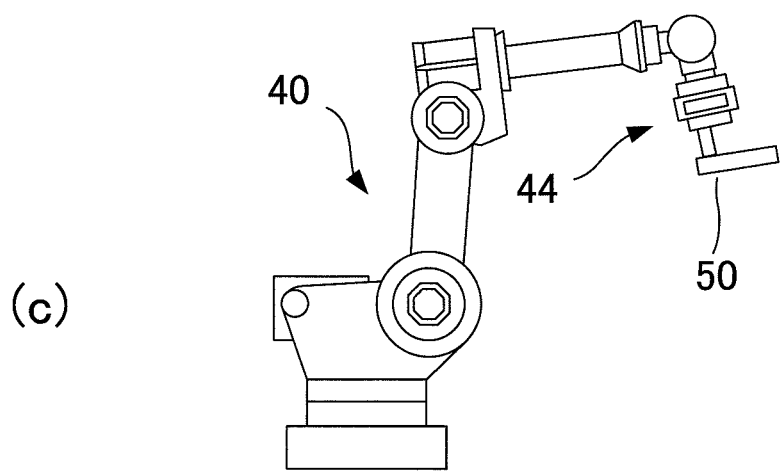

A process for calculating the position of the center of gravity of the workpiece 50 by the center-of-gravity position calculating part 12 will be described below. The center-of-gravity position calculating part 12 calculates a position of the center of gravity of the workpiece 50, based on the force data obtained by the force sensor 42. The center-of-gravity position calculating part 12 may be optionally provided with a weight obtaining part 18 which obtains the weight of the workpiece 50 based on the force data. The force data used to calculate the center-of-gravity position and the weight of the workpiece 50 is obtained with a plurality of postures of the robot 40. In other words, the force data is obtained in association with the positions or postures of the tool 44, the workpiece 50, or the end effector at the tip portion of the robot arm of the robot 40, while in a suspended state or in operation. As shown in FIG. 3, in the course of movement for picking out the workpiece 50 (in the order of (a), (b), and (c)), the workpiece 50 can be preferably changed in its postures.

When the moving position or the moving path of the workpiece 50 is taught, whether or not the center-of-gravity position and the weight can be calculated may be shown on a display of the teaching device, or indicated by sound from or vibration of the teaching device, or by an indicator lamp of the teaching device. Whether or not the center-of-gravity position and the weight of the workpiece 50 can be calculated can be determined, based on whether or not accurate results can be obtained when a given workpiece whose center-of-gravity position and weight are known is actually moved. This determining process is carried out based on whether or not the center-of-gravity position exceeds a predetermined threshold or the weight calculated exceeds a predetermined threshold, or whether or not a matrix of the relational expressions used in the calculation is degenerated, or whether or not a condition number of the matrix in the relational expressions is smaller than a predetermined threshold.

In order to calculate the center-of-gravity position and the weight of the workpiece 50, the control device 10 may operate the robot 40 to automatically change the posture of the workpiece 50 so as to ensure that the workpiece 50 takes a plurality of postures in the course of the movement. In this case, when a given moving path is specified, the control device 10 automatically creates an operating command to the robot 40 so that the workpiece 50 takes a plurality of postures on the moving path. Alternatively, the teaching program may be corrected to change the posture of the workpiece 50 so that the workpiece 50 can take an appropriate posture during the movement.

For example, as disclosed in JP-A-5-116081, JP-A-2012-40634 and JP-A-7-205075, the center-of-gravity position calculating part 12 and the weight obtaining part 18 calculate the center-of-gravity position and the weight of the workpiece 50, respectively, based on a gravity force according to the force data at the time of suspending the robot 40. Alternatively, the center-of-gravity position and the weight of the workpiece 50 may be calculated based on a gravity force and an inertia force according to the force data of the robot 40 in operation. In any case, the center-of-gravity position and the weight of the tool 44 are obtained beforehand. The center-of-gravity position and the weight of the tool 44 are calculated by means of the center-of-gravity position calculating part 12 and the weight obtaining part 18 with the tool not holding a workpiece. The center-of-gravity position and the weight of the workpiece 50 are calculated based on the center-of-gravity position and the weight of the tool 44 and the workpiece 50 combined together, and on the center-of-gravity position and the weight of the tool 44, which are obtained beforehand. In this connection, in the case where the same effect can be provided when the center-of-gravity position is calculated based on a force acting on the force sensor 42 by both the tool 44 and the workpiece 50 to replace the center-of-gravity position of the workpiece 50 of the present invention with the resultant, the resultant may be used as well for simplicity.

If the force data of the robot 40 in operation is used, a known identification method, which is applied for identifying inertia parameters of a link (mass, the position of center of gravity and inertia tensor), may be used. For example, Newton-Euler equation with respect to an object attached to the force sensor 42 is established to calculate the weight and the center-of-gravity position of the object attached to the force sensor 42 (the tool 44 and the workpiece 50 held by the tool 44) by least square estimation with the relational expression with respect to a plurality of postures. Based on the center-of-gravity position and the weight of the tool 44, which are obtained beforehand, and on calculation result, the center-of-gravity position and the weight of the workpiece 50 held by the tool 44 are calculated.

In this connection, instead of calculating the weight of the workpiece 50 in the above-described way, the weight obtaining part 18 may use a weight which is measured or calculated beforehand. If the weights of the respective workpieces 50 are not considerably different from one another, and a known weight may be used, a process for calculating the weight of the workpiece 50 can be omitted. In this case, an error in relation to calculating the center-of-gravity position can be reduced.

If the tool changes its center-of-gravity position as it moves, for example in the form of two claws opening and closing, positions of the center of gravity and weights of constituent elements of the tool are obtained beforehand. In addition, means for measuring a length of a movable portion of the tool, for example, for measuring a stroke length of the claw is used. The center-of-gravity position of the tool is corrected based on the stroke length, the center-of-gravity position and the weight of the movable portion. In this way, the center-of-gravity position of the tool, and therefore the center-of-gravity position of the workpiece 50 can be accurately calculated.

If it is determined that the weight and the center-of-gravity position of the workpiece 50 cannot be calculated, or if it is determined that the weight and the center-of-gravity position of the workpiece 50 are considerably different from predetermined thresholds so that the results are presumably inaccurate, it is assumed that the workpiece 50 is not stably held by the tool 44. In this connection, in some cases, the center-of-gravity position and the weight of the workpiece 50 cannot be calculated due to an inappropriate posture of the robot 40 at the time of obtaining the force data. In order to prevent this, once the workpiece 50 is moved to a predetermined position, the workpiece 50 may be moved on the same moving path. Along this moving path, a position is taught so that the center-of-gravity position and the weight of the workpiece 50 can be calculated.

If the center-of-gravity position of the workpiece 50 cannot be calculated, a warning sign may be displayed on a teaching operation panel of the robot 40 to inform the operator of an inappropriate posture of the robot 40. Further, if the weight of the workpiece 50 calculated exceeds a predetermined threshold, it may be assumed that the holding state is inappropriate, for example, as multiple workpieces 50 being held.

In the case where the center-of-gravity position and the weight of the workpiece 50 cannot be frequently calculated, or where it is frequently determined that the calculation result is inaccurate, there is a possibility that the measurement result of the force sensor is inaccurate. Before the workpiece 50 is held by the tool 44, the workpiece 50 is irregularly placed in a container 52. Therefore, for example, when the workpiece 50 is picked out, the workpiece 50 may come in contact with other workpieces 50 and/or the container 52. This may result in damaging the force sensor 42. Accordingly, the conveying process may be stopped as necessary, or when the conveying process is not carried out, for example, at the time of maintenance, a test may be performed as to whether or not the force sensor 42 functions in an intended way with a workpiece whose center-of-gravity position and weight are known by comparing the center-of-gravity position and weight calculated with the known values.

The estimating part 22 estimates a holding state of the workpiece 50 based on the relationship between the position of the tool 44 and the center-of-gravity position of the workpiece 50 calculated by the center-of-gravity position calculating part 12. Alternatively, the estimating part 22 estimates a holding state of the workpiece 50 based on the position of the tool 44, the center-of-gravity position of the workpiece 50 and the weight of the workpiece 50. According to the estimation result by the estimating part 22, the operating command modifying part 16 modifies an operating command to the robot 40. Modification of the operating command to the robot 40 carried out by the operating command modifying part 16 may include an adjustment, correction and switch of the operating command.

The processes for estimating the holding state of the workpiece 50 carried out by the estimating part 22 and an exemplary modification to the operating command by the operating command modifying part 16 based on the result of the estimation are explained.

(Case I): The Force Data Changing Beyond a Predetermined Threshold Range

If the force data obtained by the force sensor 42 changes beyond a predetermined threshold range, it can be assumed that a position of the workpiece 50 relative to the tool 44 is not constant. Therefore, in such a case, the estimating part 22 estimates that the workpiece 50 is in an unstable state as not being appropriately held by the tool 44. In this case, for example, the operating command modifying part 16 has the workpiece 50 put back in the container 52 (Operation I-I). The workpiece 50 is put back in the container 52 at any position within a predetermined range from the position from which the workpiece was picked out, any position determined based on the regional data of the container, or a position of the center of the container. Unless specifically indicated otherwise, the above matter will apply to the other embodiments described herein. Alternatively, the operating command may be modified so that the workpiece 50 is once put on a working table nearby and held again in a more stable manner (Operation I-II). Alternatively, the operating command may be modified so as to lower the moving speed of the robot 40 at the time of conveying the workpiece 50 than the specified speed (Operation I-III).

(Case II): The Weight of the Workpiece 50 is being Out of a Predetermined Threshold Range If the weight of the workpiece 50 obtained by the weight obtaining part 18 exceeds an upper limit of the threshold range, it is assumed that more than one workpieces 50 are erroneously held. In such a case, the operating command is modified so as to have the workpiece 50 put back in the container 52 (Operation II-I), or put the workpiece 50 on a working table and hold it again in a stable holding state (Operation II-II). If the weight of the workpiece 50 is lower than a lower limit of the threshold range, the estimating part 22 estimates that the workpiece 50 is not held. In this case, the operating command modifying part 16 modifies the operating command to the robot 40 for the sake of safety so as to put the workpiece 50 back in the container 52 and to hold the workpiece 50 in the container 52 again (Operation II-III).

(Case III): A Distance Between the Center-of-Gravity Position of the Workpiece 50 and the Holding Position of the Workpiece 50 by the Tool 44 is being Out of a Predetermined Threshold Range Normally, if a distance between the center-of-gravity position of the workpiece 50 and the holding position of the workpiece 50 is short, the robot 40 is operated in a predetermined manner. For example, the workpiece 50 may be conveyed as it is, or the workpiece 50 may be moved to a measuring position where the position and the posture of the workpiece 50 with respect to the reference coordinate system of the robot 40 can be corrected by using a visual sensor. However, in the case where the workpiece 50 is picked out from those randomly stacked on top of another, an upper portion of the inclined workpiece 50 is often held. Accordingly, the workpiece 50 is often held at a position distant from its center of gravity.

If the holding force for holding the workpiece 50 by the tool 44 is weak, the workpiece 50, which is held at a position distant from its center of gravity, may fall off or a positional relationship between the tool 44 and the workpiece 50 may be changed. Accordingly, the operation command modifying part 16 modifies the operating command so as to put the workpiece 50 back in the container 52 (Operation III-I), or put the workpiece 50 on a working table and hold the workpiece 50 again in a stable manner (Operation III-II). Alternatively, the operating command modifying part 16 modifies the operating command so as to lower a speed at the time of conveying the workpiece 50 than the specified speed, based on the distance between the holding position of the workpiece 50 and the center-of-gravity position of the workpiece 50. For example, in the case where distance D between the holding position and the center-of-gravity position exceeds a first threshold Th1, the conveyance speed is adjusted to the conveyance speed V' lower than the specified speed V, in accordance with the equation: V'=V×(Th1/D). On the other hand, if the distance D exceeds a second threshold Th2 greater than the first threshold Th1, the conveyance speed is adjusted to the conveyance speed V' which is a fixed setting value lower than the specified speed.

Although it is optional, the weight of the workpiece 50 obtained by the weight obtaining part 18 may be used as well. For example, if the weight of the workpiece 50 is lower than a predetermined threshold, it is determined that the workpiece 50 can be conveyed without problem even in an unstable holding state. If this is the case, the workpiece 50 is conveyed as it is, without carrying out Operations (III-1) to (III-III).

Figure 4:
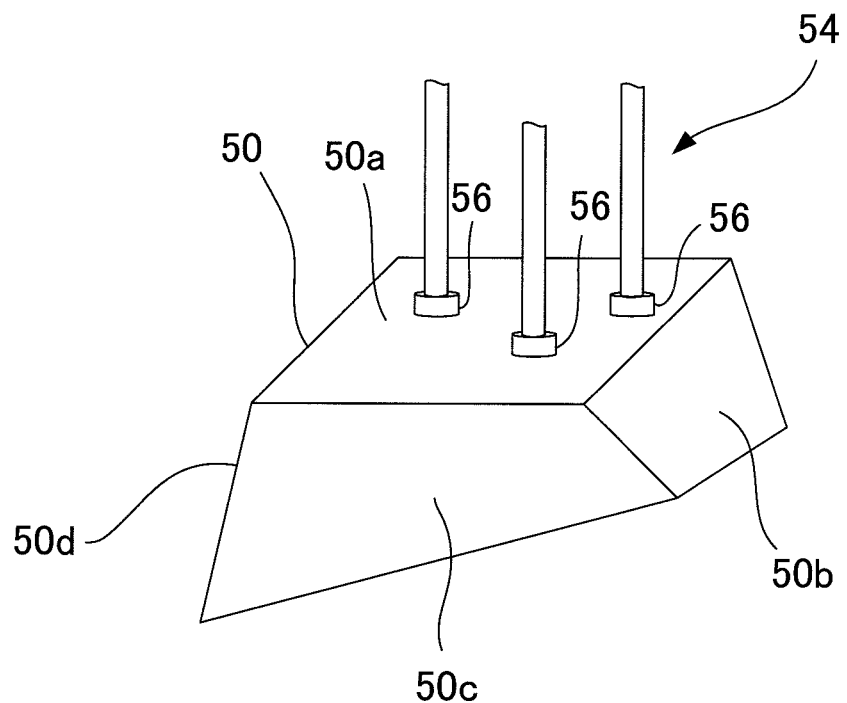
FIG. 4 shows a manner in which the workpiece is held by a tool having three sucking units.

FIG. 4 shows a manner in which the workpiece 50 is held by a first tool 54 having three sucking units 56. In the case of the first tool 54, a position and posture of the face of the workpiece 50 held by the first tool 54 can be determined by a holding manner by the first tool 54. On the other hand, the workpiece 50 has a plurality of faces 50a, 50b, 50c, and 50d, which may be possibly held by the first tool 54. Therefore, it should be determined on which face the workpiece 50 is held, or whether or not the workpiece 50 is held on an intended face.

Figure 5:
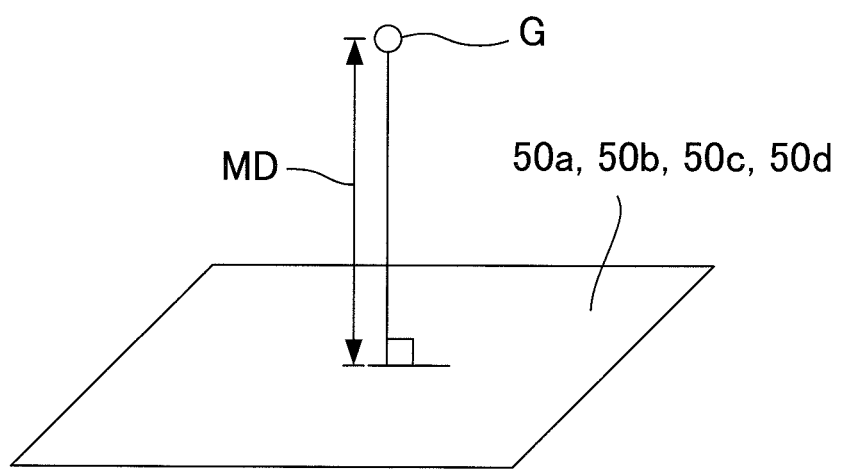
FIG. 5 is a diagram to explain a determining process for determining a holding face of the workpiece.

On which face the workpiece 50 is held or whether or not the workpiece 50 is held on the intended face can be determined by the shortest distance storing part 28 and the shortest distance obtaining part 30 of the control device 10 as described below. FIG. 5 is a diagram to explain a determining process for determining a holding face of the workpiece. The shortest distance obtaining part 30 calculates the shortest distance MD1 from the plane on the holding face of the workpiece 50 to the center-of-gravity position. The shortest distance storing part 28 stores the shortest distance MD from the plane on each face 50a, 50b, 50c and 50d of the workpiece 50 to the center-of-gravity position G beforehand. The shortest distance is defined as a shortest distance from the plane on the face of the workpiece to the center-of-gravity position. The shortest distance is a distance from a point, at which a line extending from the center-of-gravity position G crosses the plane at a right angle in the three-dimensional space, to the center-of-gravity position G. The plane on the face of the workpiece is a plane defined on the surface of the workpiece. The plane may be an approximate plane representative of the face of the workpiece, or a tangential plane at a position on the face of the workpiece, or a plane formed by three positions on the face of the workpiece at which the workpiece can be held. The shortest distance storing part 28 may obtain the shortest distance MD beforehand, by means of the center-of-gravity position calculating part 12 and the shortest distance obtaining part 30 when the workpiece 50 is held on each face by the tool.

In the case where the shortest distance MD from the plane on each face of the workpiece 50, on which the workpiece is possibly held, to the center-of-gravity position G is different from one another, the determination process can be carried out as follows. The shortest distance obtaining part 30 calculates the shortest distance MD1 from the plane on the holding face of the workpiece 50 to the center-of-gravity position, based on the position and posture of the face of the workpiece 50 and the center-of-gravity position G calculated when the workpiece is held. Then, on which face of the workpiece 50 is held is determined by comparing the shortest distance MD1 calculated with the shortest distance MD, which is stored by the shortest distance storing part 28, from the plane on each face 50a, 50b, 50c and 50d of the workpiece 50 to the center-of-gravity position G. For example, it is determined that the face of the workpiece 50 having the shortest distance MD1, which is the closest to MD, is the holding face. Alternatively, the holding face may be identified, depending on whether or not a difference between the shortest distance MD1 calculated and the shortest distance MD obtained beforehand falls within a predetermined threshold. In the case where the shortest distance MD from the plane on each face of the workpiece 50, on which the workpiece 50 is possibly held, to the center-of-gravity position G is different between one on the intended face and those on other faces, so that it is only necessary to determine as to whether the holding face is the intended face, the determination can be carried out by comparing the shortest distance MD on the intended face with the shortest distance MD1 calculated by the shortest distance obtaining part 30.

If it is determined by the estimating part 22 that the workpiece 50 is held on an intended face, the workpiece 50 is conveyed as it is (Operation III-IV). On the other hand, if it is determined that the holding face of the workpiece 50 is not an intended face, the operating command modifying part 16 modifies the operating command so as to put the workpiece 50 on a working table and then hold the workpiece 50 again in a stable manner (Operation III-V). Alternatively, the operating command modification part 16 modifies the operating command so as to carry out the operation corresponding associated with the holding face.

The position and posture of the plane on the face of the workpiece 50 can be obtained as follows. When the face of the workpiece 50 is held at three or more positions (FIG. 4 shows the example in which the face of the workpiece 50 is held at three positions), the position and posture of the plane on the face of the workpiece 50 are calculated based on a plurality of known holding positions with respect to the reference coordinate system of the robot 40 (In the case of FIG. 4, the position and posture of the face are obtained from the three holding positions). The tool may be a pneumatic suction tool designed to generate an attractive force. The pneumatic suction tool may be designed to have a spring or bellows and to change its position when pressed against the face of the workpiece 50, depending how far the tool is pressed, to release the impact or change the holding position, depending on the inclination of the face of the workpiece 50. The pneumatic suction tool may also be designed to move the holding position to the reference position when lifted, and fixed during the conveyance.

Figure 6:
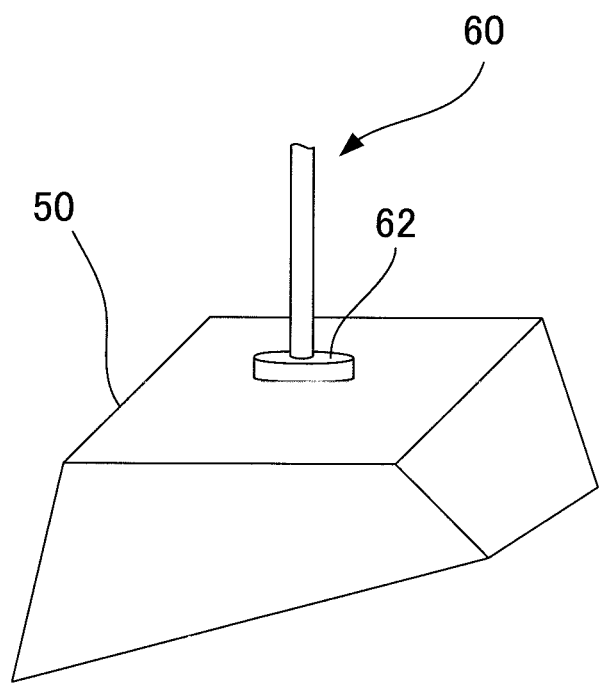
FIG. 6 shows a tool designed to be in plane contact with a surface of a workpiece.

It may be possible to use a tool having a holding face whose position and posture with respect to the reference coordinate system of the robot 40 are known. In this case, the workpiece 50 is held with the holding face of the tool being in contact with the face of the workpiece 50. The position and posture of the plane on the face of the workpiece 50 being held are determined based on the position and posture of the holding face of the tool. For example, a second tool 60 shown in FIG. 6 has a suction pad 62 at the tip portion, which is designed to be in planar contact with the face of the workpiece 50. In this case, the workpiece 50 is picked out while its posture is maintained relative to the second tool 60. Accordingly, when the position and posture of the suction pad 62 of the second tool are known, the position and posture of the plane on the holding face of the workpiece 50 can be obtained based on the information on the suction pad 62.

If the tool is designed to hold the workpiece 50 at one or two positions and there is no information available with respect to the position and posture of the face on the tip portion of the tool, the tool is brought into contact with the face of the workpiece 50 at three or more positions with the position of the workpiece being unchanged, prior to picking up the workpiece 50. Then, the position and posture of plane on the face of the workpiece 50 can be calculated based on the three or more contact positions.

The position and posture of the plane on the face of the workpiece 50 may be determined, for example, by using a visual sensor, before the workpiece 50 is held by the tool. In the case where the position and posture on the face of the workpiece 50 are determined before the workpiece 50 is held, it is necessary to fix the workpiece 50 or minimize the movement of the workpiece 50 when the workpiece 50 is held. Accordingly, in this case, it is preferable that a portion of the tool, which comes in contact with the workpiece 50, is configured by a flexible structure, so that the shape of the portion can flexibly change when the tool comes in contact with the workpiece 50. For example, the portion of the tool may be configured by a spring or bellows structure, a flexible structure provided with a plurality of gaps which allow air to pass through. The tool may have a pneumatic sucking mechanism designed to attract and hold the workpiece.

In this connection, the face of the workpiece 50 held by the tool is not necessarily a plane. The face of the held workpiece 50 may have a rough surface to the extent which it can be considered as a plane in order to carry out the above processes or a gentle curved surface. The workpiece 50 may include a plane portion on which the workpiece 50 is held.

The above process is effective in the case where it is necessary to identify on which face the workpiece 50 is held, but the holding face cannot be identified by a visual sensor or the like.

In Case (III) described before, i.e., in the case where a distance between the center-of-gravity position of the workpiece 50 and the holding position of the workpiece 50 by the tool 44 does not fall within a predetermined threshold range, the estimating part 22 may estimate a posture of the workpiece 50 as well as its longitudinal direction based on the holding position of the workpiece 50 and the direction of a vector of the center-of-gravity position. The operating command modifying part 16 can correct a posture of the workpiece 50 based on the result of estimation.

Figure 7:
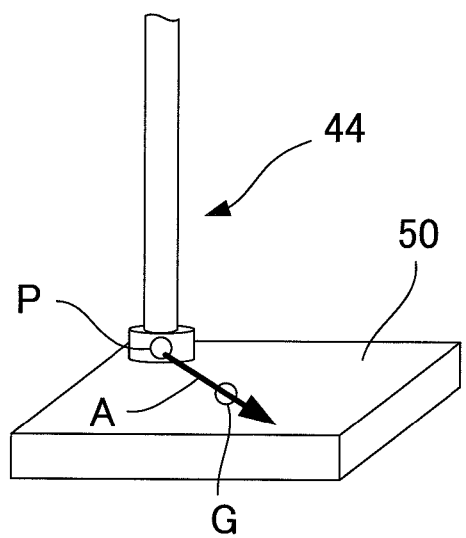
FIG. 7 shows various states of the workpiece held by the tool.
Figure 7:
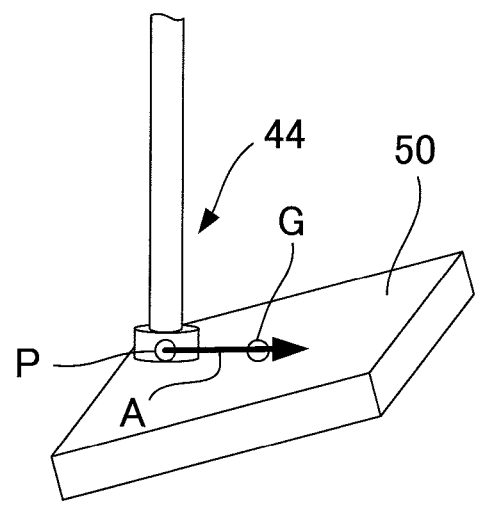
Figure 7:
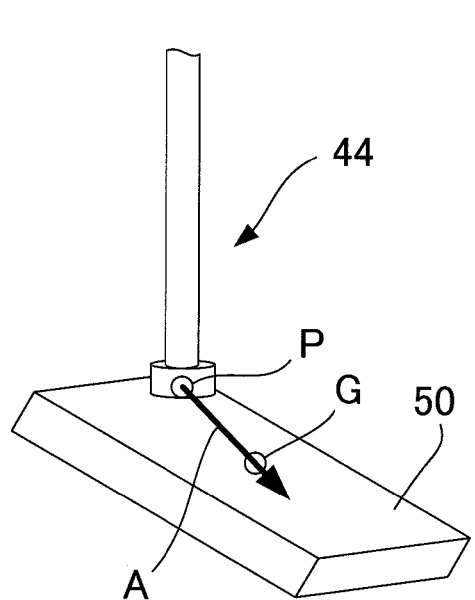
Figure 7:
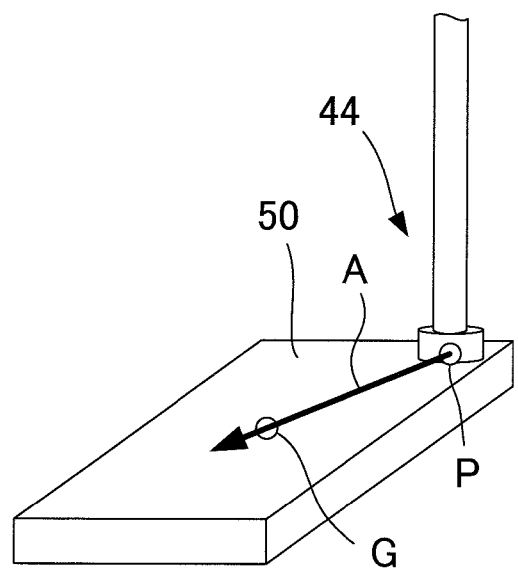

In FIG. 7, different states (a) to (d) of the workpiece 50, which is held by the tool 44 at the same position, are shown by way of example. The Vector A directed from the holding position P to the center-of-gravity position G is depicted with an arrow. As illustrated, even when the workpiece 50 is held at the same position, the vector A may be oriented to various directions.

In the case described below, the workpiece 50 is held in a predetermined position and the workpiece 50 cannot be rotated around an axis extending through the holding position and the center-of-gravity position of the workpiece 50, or it is possible to disregard rotation around the axis. In this case, if a posture of the axis of the workpiece 50 with respect to the tool 44 is known, it is possible to estimate the posture of the workpiece 50. As shown in FIG. 7, in the case where it can be assumed that the direction of the vector A from the holding position P to the center-of-gravity position G is approximately a posture and longitudinal direction of the workpiece 50, the posture and longitudinal direction of the workpiece 50 can be estimated based on the direction of this vector A. In this way, it is possible to estimate the position and posture of the workpiece 50 from the position and posture of the tool 44, the holding position of the workpiece 50 and the posture of the workpiece 50 with respect to the tool 44.

Alternatively, the posture and the longitudinal direction of the workpiece 50 can be obtained by associating the vector A oriented from the holding position P to the center-of-gravity position G with the posture and the longitudinal direction of the workpiece 50. In this case, the vector A oriented from the holding position P to the center-of-gravity position G is converted to a vector B representative of the posture of the workpiece 50 relative to the tool 44, e.g., a vector oriented parallel with the principal axis of inertia. For this purpose, a transformation matrix is obtained beforehand. The transformation matrix transforms a vector oriented from a predetermined position on the workpiece 50 to the center-of-gravity position G to the vector B representative of the posture of the workpiece 50 relative to the tool 44. The vector B is defined so as to obtain the posture of the workpiece 50 based thereon. Then, in accordance with the transformation matrix obtained beforehand, the vector B is calculated from the vector A oriented from the holding position P to the center-of-gravity position G. It is possible to estimate the position and posture of the workpiece 50 by position and posture of the tool 44, the holding position of the workpiece 50, and the vector B representing the posture of the workpiece 50 relative to the tool 44.

Figure 8:
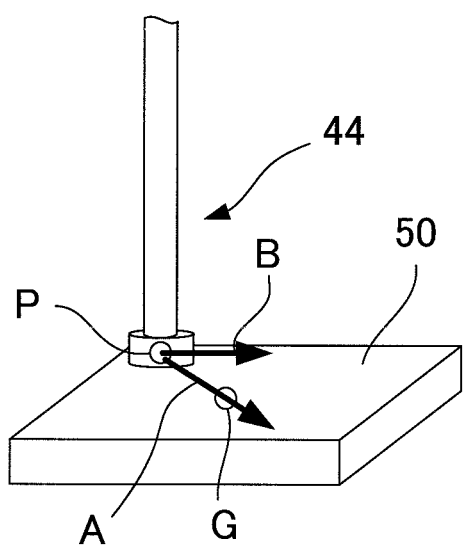
FIG. 8 shows a vector representative of a posture of the workpiece.

In this connection, the vector B representative of the posture of the workpiece 50 relative to the tool 44 is a vector which can represent the longitudinal direction and the posture of the workpiece 50 based on the vector B under the constraint condition on the position and posture of the workpiece 50. In other words, the vector B is a vector which can determine the longitudinal direction and posture of the workpiece 50 based on the holding manner of the workpiece by the tool and the vector B, irrespective of the rotation around the axis based on the vector B. An example of such a vector B is shown in FIG. 8.

In the case described below, a length of the workpiece in the longitudinal direction is longer than a predetermined threshold and a distance between the holding position and the center-of-gravity position of the workpiece is longer than another threshold. And rotation around an axis extending through the holding position and the center-of-gravity position can be disregarded, or the workpiece is held so as not to rotate the workpiece around the axis. In these cases, the posture and the longitudinal direction of the workpiece can be estimated based on the direction of vector oriented from the holding position and the center-of-gravity position. Based on the posture of the tool, and the posture of the workpiece relative to the tool, the posture of the workpiece can be estimated. In this case where the length of the workpiece in the longitudinal direction is longer than a predetermined threshold, and the distance between the holding position and the center-of-gravity position of the workpiece is longer than another threshold, an approximate position and posture can be estimated by the position and posture of the tool and the vector representative of the posture of the workpiece relative to the tool, even when the holding position of the workpiece is not predetermined. When the workpiece is long and the holding position is near the end of the workpiece, such estimation can be practically applicable.

In the case where the distance between the holding position and the center-of-gravity position is greater than a predetermined threshold, even when the holding position is not predetermined, the posture and the longitudinal direction of the workpiece can be estimated with a minor error, based on the holding position and the center-of-gravity position. Further, in the case where it is unnecessary to completely identify the posture of the workpiece and rough estimation is sufficient, it can be applied to more objects. As the distance between the holding position and the center-of-gravity position is smaller, the error in the result of estimation of the posture is greater. Therefore, a threshold is set, depending on the acceptable error in postures. In the case where it is unnecessary to identify the posture of the workpiece, it is acceptable to hold the workpiece at either of its ends. But in the case where it is necessary to identify the posture of the workpiece, the workpiece is held at a position on either end of the workpiece, or at any position between either end of the workpiece and the center of gravity.

If the distance between the holding position and the center-of-gravity position is greater than a predetermined threshold, it can be assumed that a vector oriented from the holding position of the workpiece to the center-of-gravity is a vector oriented from a predetermined position to the center-of-gravity position. A transformation matrix is obtained beforehand. The transformation matrix transforms the vector oriented from the predetermined position to the center-of-gravity position to a vector representative of the posture of the workpiece relative to the tool. In this way, the posture and the longitudinal direction of the workpiece can be obtained based on the holding position of the workpiece, the transformation matrix obtained beforehand, and the vector oriented from the holding position to the center-of-gravity position.

Figure 9:
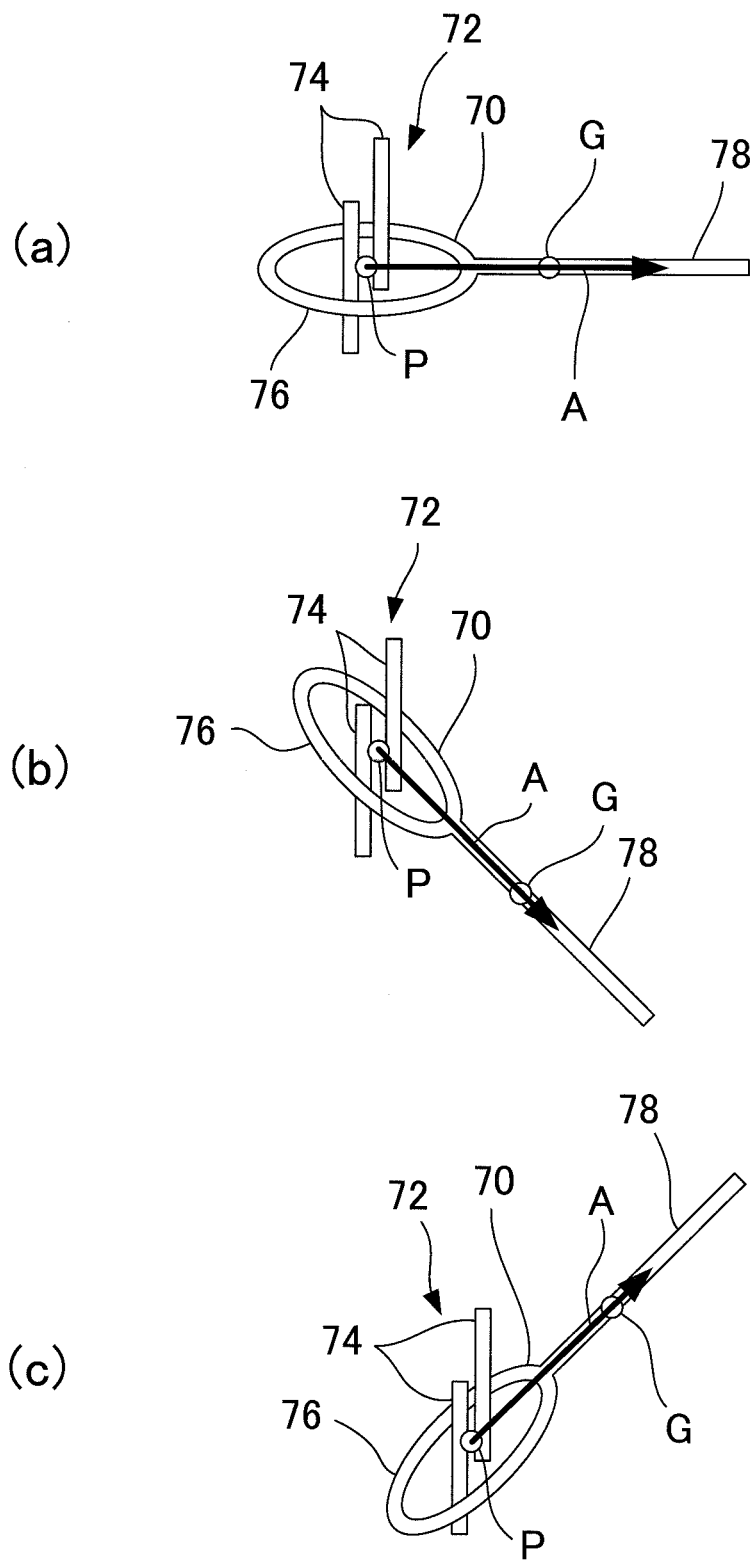
FIG. 9 shows an exemplary configuration of the tool used for holding a workpiece.

FIG. 9 shows an exemplary configuration of a workpiece 70 and a third tool 72 used for holding the workpiece 70. The third tool 72 has two claws 74 at its tip portion. The workpiece 70 has a ring-shaped first portion 76 formed with a hole at its end, and a bar-shaped second portion 78. The third tool 72 is designed to hold the workpiece 70 by moving the two claws 74, which are positioned in the hole of the first portion 76, away from each other, and applying a force on the inner circumference of the first portion 76. In this case, when the workpiece 70 is held by the third tool 72, rotation around the longitudinal axis extending along the second portion 78 is restricted. In examples (a) to (c) of FIG. 9, the workpiece 70 is held by the third tool 72 at the same position, but the postures of the workpiece 70 are different from one another.

The holding position P of the workpiece 70 is set, for example, in the middle of the two positions on the inner circumference, with which the two claws 74 of the third tool 72 come in contact. With the assumption that the holding position P and the center-of-gravity position G is on the longitudinal axis of the workpiece 70, the direction of the vector A oriented from the holding position P to the center-of-gravity G approximately matches the longitudinal direction of the workpiece 70, as illustrated. Therefore, the longitudinal direction of the workpiece 70 can be estimated based on the vector A oriented from the holding position P to the center-of-gravity position G. In addition, the posture of the workpiece 70 relative to the tool 72 can be estimated based on the longitudinal direction of the workpiece 70. Accordingly, the posture of the workpiece 70 relative to the tool 72 can be estimated from the direction of the vector A, by associating the posture of the workpiece 70 with the longitudinal direction of the workpiece 70. The posture of the workpiece can be estimated based on the posture of the tool 72 and the posture of the workpiece 70 relative to the tool 72. When the holding position of the workpiece 70 is close to a predetermined position, the position and posture of the workpiece 70 can be estimated based on the position and posture of the tool 72, the holding position of the workpiece 70 and the posture of the workpiece 70 relative to the tool 72. As the holding position is closer to the predetermined position, the position of the workpiece 70 can be accurately estimated.

Even in the case where the holding position P is not on the longitudinal axis of the workpiece 70, an approximate longitudinal direction and posture of the workpiece 70 can be estimated from the direction of the vector A in the same manner. If a transformation matrix for transforming the vector A oriented from the holding position P to the center-of-gravity G to a vector representative of the posture of the workpiece, e.g., a vector oriented in the longitudinal direction of the workpiece 70, is obtained beforehand, the longitudinal direction and the posture of the workpiece 70 can be estimated by using the transformation matrix. In this way, in the case where the workpiece is held with rotation around an axis being fixed, the posture of the workpiece relative to the tool can be obtained based on the vector from the holding position to the center-of-gravity position to estimate the longitudinal direction and the posture of the workpiece. The position of the workpiece 70 can be estimated in the same way.

Figure 10:
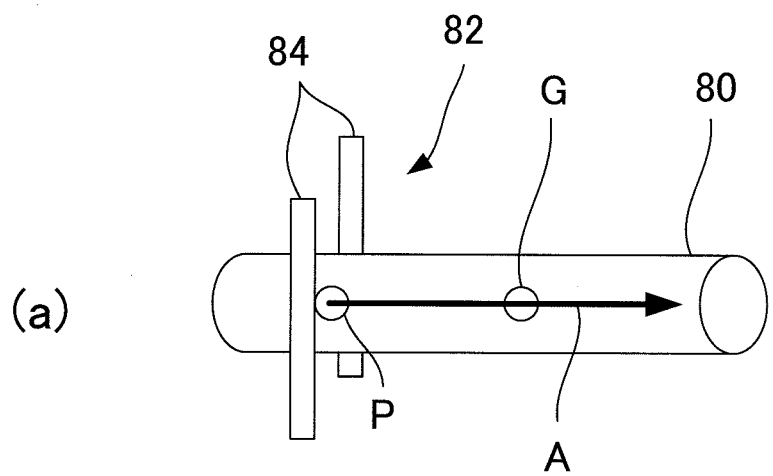
FIG. 10 shows another exemplary configuration of the tool used for holding a workpiece.
Figure 10:
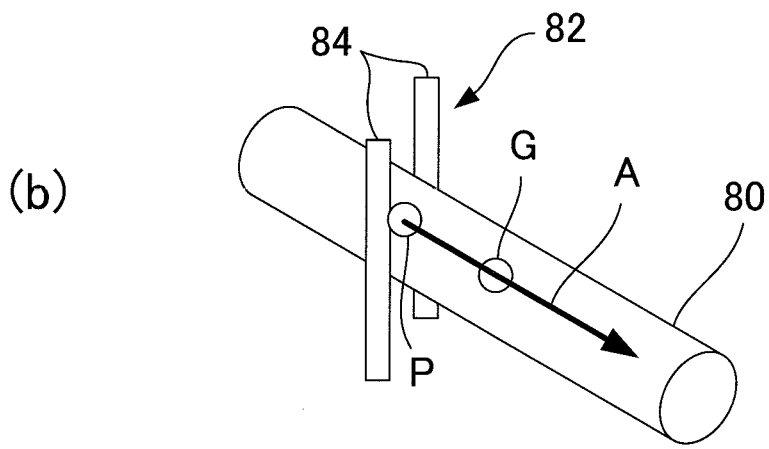
Figure 10:
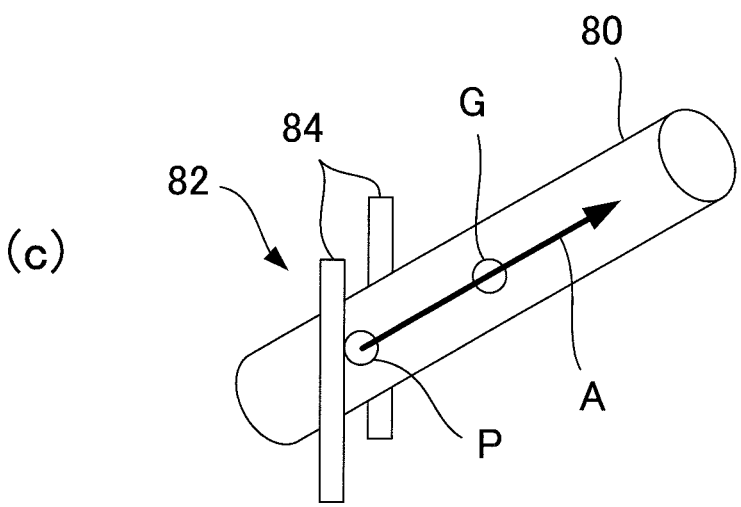

FIG. 10 shows another exemplary configuration of a workpiece 80 and a fourth tool 82 used for holding the workpiece 80. A length of the workpiece 80 in the longitudinal direction is greater than a predetermined threshold, and a distance between the holding position of the workpiece and the center-of-gravity position is greater than another threshold. In this example, the workpiece 80 generally has a cylindrical shape. The fourth tool 82 is designed to hold the workpiece 80 at two positions on the outer circumference by moving the two claws 84 at the tip portion closer to each other. Also in this case, the workpiece 80 is held with rotation around the longitudinal axis being restricted. In examples (a) to (c) of FIG. 10, the workpiece 80 is held by the fourth tool 82 at the same position, but takes different postures from one another.

The holding position of the workpiece 80 is set, for example, in the middle of the two positions on the outer circumference of the workpiece 80, with which the two claws 84 of the fourth tool 82 come in contact. With the assumption that the holding position P and the center-of-gravity G is on the longitudinal axis of the workpiece 80, the direction of the vector A oriented from the holding position P to the centerof-gravity position G approximately matches the longitudinal direction of the workpiece 80, as illustrated. Accordingly, the longitudinal direction of the workpiece 80 can be estimated based on the vector A oriented from the holding position P to the center-of-gravity position G. In addition, the posture of the workpiece 80 relative to the tool 82 can be estimated based on the longitudinal direction of the workpiece 80. Therefore, the posture of the workpiece 80 relative to the tool 82 can be estimated from the direction of the vector A by associating the longitudinal direction of the workpiece 80 with the posture of the workpiece 80. The posture of the workpiece 80 can be estimated based on the posture of the tool 82 and the posture of the workpiece 80 relative to the tool 82. In the case where a length of the workpiece 80 in the longitudinal direction is greater than a predetermined threshold, and a distance between the holding position of the workpiece and the center-of-gravity position of the workpiece 80 is greater than another predetermined threshold, an approximate position and posture of the workpiece can be estimated based on the position and posture of the tool 82 and the posture of the workpiece 80 relative to the tool 82 even when the holding position of the workpiece 80 is not predetermined.

In the case where the length of the workpiece 80 in the longitudinal direction is greater than a predetermined threshold, and the distance between the holding position of the workpiece and the center-of-gravity position of the workpiece 80 is greater than another predetermined threshold, even when the holding position P is not on the longitudinal axis of the workpiece 80, an approximate longitudinal direction, position and posture of the workpiece 80 can be estimated from the direction of the vector A. If a transformation matrix for transforming the vector A oriented from the holding position P to the center-of-gravity G to a vector representative of the posture of the workpiece relative to the tool, e.g., a vector oriented in the longitudinal direction of the workpiece 80, is obtained beforehand, the longitudinal direction and the posture of the workpiece 80 can be calculated by using the transformation matrix. In this way, in the case where the workpiece is held with rotation around an axis being fixed, the length of the workpiece is greater than a predetermined threshold and the distance between the holding position of the workpiece and the center-of-gravity position of the workpiece is greater than another predetermined threshold, the longitudinal direction, the position and posture of the workpiece can be estimated by obtaining the posture of the workpiece relative to the tool based on the vector from the holding position to the center-of-gravity position.

In the above-described several examples, the workpiece may be intentionally held at an end portion or at a position near an end portion distant from the center-of-gravity position of the workpiece, since the greater distance between the holding position and the center-of-gravity position may allow the posture of the workpiece to be obtained or to be obtained more accurately.

In the above examples, in which the longitudinal direction, the position and posture of the workpiece can be estimated based on the holding manner of the workpiece and the vector oriented from the holding position to the center-of-gravity of the workpiece, or the vector representative of the posture of the workpiece based thereon, the following operations can be carried out, depending on the result of the estimation.

(1) The position and posture of the workpieces are corrected to move them to the conveyor or the destination of the workpiece in an aligned manner.

(2) The workpiece is moved with a changed position and posture so as to allow the measurement by the measuring device for the workpiece.

It is preferable that the position and posture are estimated as accurately as possible, but as long as an approximate position and posture are estimated, the above measurement can be performed. The measurement of the workpiece is performed in order to accurately correct or detect the position and posture of the workpiece, or check a quality or condition of the workpiece. For example, the position and posture of the workpiece may be changed so that, when using the measuring device with a visual sensor or the like which is adapted to measure a position and posture of the workpiece, the position and posture of the workpiece become desirable for the measurement, or the workpiece can be positioned within the measurement range, or the longitudinal direction of the workpiece is oriented in a predetermined direction, or the workpiece is put on the plane for the measurement. The process to accurately correct the position and posture of the workpiece in cooperation with the measuring device as above is carried out by the holding position correcting part 32 of the control device 10. And the holding position correcting part 32 of the control device 10 corrects the position and posture of the workpiece by using the measuring device which is adapted to measure a position and posture of the workpiece. In this way, the position and posture of the workpiece is corrected by the operating command modifying part 16 based on the result of the estimation of the holding state of the workpiece when the control device is adapted to cooperate with a measuring device which is adapted to measure a position and posture of the workpiece.

(3) The conveyance of the workpiece continues as is, if there is no need to change the position and posture of the workpiece.

(4) In the case where the direction of the vector from the holding position to the center-of-gravity position relative to the tool is beyond a predetermined range, it is determined that the holding state of the workpiece is inappropriate since it can be assumed that the posture of the workpiece is not within a desirable range, or the vector is incorrectly calculated. In this case, the operating command modifying part 16 modifies the operating command so as to put the workpiece back in the container or put the workpiece on a working table and hold it again in a stable posture.

According to the above operation, it is possible to convey the workpiece in a stable manner. In addition, by estimating an approximate position and posture of the workpiece, it is possible to reduce the number of operations for putting the workpiece on another working table to detect the position and posture of the workpiece and holding it again, and carry out such operation only when necessary.

If the distance between the center-of-gravity position of the workpiece and the holding position of the workpiece exceeds a predetermined threshold, the position and posture of the workpiece may be corrected during the conveyance so as to match the direction of the vector in the moving direction for the conveyance of the workpiece with that of the vector oriented from the center-of-gravity to the holding position. If there are more than one possible holding positions, the holding position is defined at the holding position representative of those, or the position at the center of the holding positions. In this way, the holding state of the workpiece during the conveyance can be prevented from being unstable. If the weight of the workpiece is smaller than a predetermined threshold, it can be determined that the holding position is stable during the conveyance, and such operation is not carried out.

By carrying out the above-described operation and calculating the weight of the workpiece picked out, it is possible to carry out the process for determining the type of the workpiece, the process for testing the quality of the workpiece or the process for checking whether or not the parts are correctly attached to the workpiece. The determination of the type of the workpiece can be carried out by the determining part 24 of the control device 10. The test of the quality of the workpiece can be carried out the testing part 26 of the control device 10.

If the workpiece is always held by the tool with the same position and posture relative to the tool, e.g., when the workpiece is at a predetermined position or the workpiece can be held in the same positional relationship by using a measuring device such as a visual sensor, the determination of the type of the workpiece by the determination part 24, checking whether or not the workpiece is an intended one by the testing part 26, and checking whether or not the parts are correctly attached to the workpiece can be carried out easily and rapidly by calculating the center-of-gravity position of the workpiece and comparing the value calculated with a predetermined value during the conveyance of the workpiece. By using the center-of-gravity position of the workpiece, it is possible to carry out various processes even in the case where the workpiece has the same weight. In particular, it is effective when the common test using a visual sensor cannot be carried out, for example, when the workpiece is surrounded by the cover. Further, by using both the weight and the center-of-gravity position of the workpiece for the various processes, the determination or test can be carried out specifically and accurately.

The operating command to the robot may be modified by the operating command modifying part 16, depending on the workpiece. For example, at the time of conveyance, the type of the workpiece or the quality of the workpiece is determined, and based on the result of the determination, the destination of the workpiece is changed. If the workpiece is not an intended one, the workpiece may be removed. As described above, since the various processes are carried out at the time of conveyance, and the operation is carried out, depending on the result of the determination and the estimation and the testing. In addition, the force measuring part designed for general use can be used. Accordingly, the cycle time of the system can be shortened, reducing the running cost of the system. This allows the system to be used in various applications.

Further, when the workpiece is placed at a predetermined destination such as on conveyor, the workpiece is preferably placed so that the center-of-gravity of the workpiece is within a predetermined area on the conveyor, based on the center-of-gravity calculated at the time of conveyance of the workpiece. This allows the workpiece to be stably placed in position. For example, the workpiece can be prevented from falling off the conveyor. At the time of palletizing, for example, which involves placing the workpieces on top of another, whose shapes are identical but their center-of-gravity-positions are different, it is possible to offset the center-of-gravity positions so as not to locally concentrate the center-of-gravity positions.

According to the above embodiments, when the workpiece is at a predetermined position and even when the workpiece is arranged such that the desirable relationship between the tool and the center-of-gravity of the workpiece cannot be realized at the time of holding the workpiece, the holding state of the workpiece, such as stability of the holding state, the position and posture of the workpiece, on which face of the workpiece is held, can be estimated based on the center-of-gravity position of the workpiece calculated at the time of holding and conveying the workpiece. In addition, the determination of the type of the workpiece or the quality of the workpiece can be carried out. Further, various determination process can be carried out as necessary by taking into account the weight of the workpiece, the changes in the force data detected by the force detecting unit. The operation of the robot is changed, depending on the state or the condition of the workpiece obtained during the conveyance. Consequently, the various processes can be carried out during the conveyance. In addition, the number of operations for putting the workpiece on a working table and holding again can be reduced or such operation can be omitted. By using the force measuring part for general use can be used instead of an expensive testing device, the cost of the system can be reduced as well as its running cost. Furthermore, when there is a possibility of the accident during the conveyance, operation of the robot can be changed in order to prevent the accident from occurring, increasing the safety of the system.

EFFECT OF THE INVENTION

According to the present invention, the operation of the robot can be changed depending on the state or the situation of the workpiece being held. This allows various operations to be carried out as necessary, and eliminates unnecessary steps and devices, reducing the cycle time and the installation cost of the system as well as its running cost.

Although the various embodiments and variants of the present invention have been described, it is obvious for a person skilled in the art that the intended function and effect of the present invention may also be achieved by other embodiments or variants. In particular, a constituent element of the above-described embodiments and variants may be omitted or replaced, or a known means may also be added thereto, without departing from the scope of the present invention. Further, it is obvious for a person skilled in the art that the present invention can be implemented by any combination of features of the embodiments either explicitly or implicitly disclosed herein.

What is claimed is:

1. A control device for a robot, the robot comprising a tool for holding a workpiece, and a force measuring part for measuring a force acting on the tool from the workpiece when the workpiece is held by the tool, the robot being adapted to hold and convey the workpiece placed in a three-dimensional space, the control device comprising:

a center-of-gravity position calculating part configured to calculate, based on force data measured by the force measuring part for a plurality of postures of the robot holding the workpiece, a center-of-gravity position of the workpiece held by the tool when the robot holds and conveys the workpiece;

a processing part configured to carry out, based on a positional relationship between a position of the tool and the center-of-gravity position of the workpiece, at least one of an estimation process for estimating a holding state of the workpiece held by the tool, a determination process for determining a type of the workpiece held by the tool, and a testing process for testing a quality of the workpiece held by the tool, wherein the estimation process pertains to stability of the holding state of the workpiece held by the tool, or a position and posture of the workpiece held by the tool, or a longitudinal direction of the workpiece held by the tool, or a face of the workpiece on which the workpiece is held by the tool; and an operating command modifying part
  configured to modify, based on a result of (i) the estimation process pertaining to stability of the holding state of the workpiece held by the tool, or (ii) the position and posture of the workpiece held by the tool, or (iii) the longitudinal direction of the workpiece held by the tool, an operating command to the robot, and at least one of operations:
    changing a moving speed of the robot at the time of conveying the workpiece held by the tool;
    correcting a position and posture of the workpiece at the time of conveying the workpiece; and
    correcting a position and posture of the workpiece and moving the workpiece to a destination,
  or configured to modify an operating command to the robot, based on a result of the estimation process on the holding state of the workpiece pertaining to a face of the workpiece on which the workpiece is held by the tool,
  or configured to modify an operating command to the robot and change a destination of conveyance of the workpiece, based on the type of the workpiece held by the tool or on a result of the testing process on the workpiece.

2. The control device according to claim 1,
wherein the center-of-gravity position calculating part further comprises a weight obtaining part configured to obtain a weight of the workpiece,
wherein the processing part is configured to carry out, based on (i) the positional relationship between the position of the tool and the center-of-gravity position of the workpiece and (ii) the weight of the workpiece, at least one of
  the estimation process for estimating the holding state of the workpiece held by the tool,
  the determination process for determining the type of the workpiece held by the tool, and
  the testing process for testing the quality of the workpiece held by the tool.

3. The control device according to claim 1, wherein the processing part is configured to estimate, based on (i) a holding manner of holding the workpiece by the tool and (ii) the positional relationship between the position of the tool and the center-of-gravity position of the workpiece, the holding state of the workpiece by determining a posture of a predetermined axis of the workpiece relative to the tool.

4. The control device according to claim 1,
wherein the tool is configured to hold the workpiece by attracting a surface of the workpiece, and
wherein the control device further comprises:
  a shortest distance storing part for storing a shortest distance from planes on the surface of the workpiece which is held by the tool to the center-of-gravity position of the workpiece; and
  a shortest distance obtaining part configured to obtain the shortest distance from planes on the surface of the workpiece to the center-of-gravity position of the workpiece, based on a position and posture of the surface of the workpiece held by the tool,
wherein the processing part is configured to estimate the face of the workpiece held by the tool, by comparing the shortest distance stored by the shortest distance storing part with the shortest distance obtained by the shortest distance obtaining part.

5. The control device according to claim 1, wherein the operating command modifying part is configured to change, based on a result of the estimation process carried out by the processing part, a moving speed of the robot at the time of conveying the workpiece to be lower than a specified speed.

6. The control device according to claim 1, wherein the operating command modifying part is configured to cause the robot to operate, based on a result of the estimation process carried out by the processing part, so as to
  place the workpiece within a predetermined area distant from the position where the workpiece is positioned before held by the tool, or
  move the workpiece to a position where the workpiece is temporarily released and held again.

7. The control device according to claim 1, wherein the operating command modifying part is configured to cause the robot to operate, based on a result of the estimation process carried out by the processing part so as to
  change a position or posture of the workpiece at the time of conveying the workpiece, and
  when a distance between the center-of-gravity of the workpiece and the holding position of the workpiece exceeds a predetermined threshold, direct a vector in a moving direction of the workpiece during the conveyance to the same direction as a vector oriented from the center-of-gravity to a holding position.

8. The control device according to claim 1, wherein
the control device is configured to cooperate with a measuring device which is configured to measure a position and posture of the workpiece,
the operating command modifying part is configured to cause the robot to operate, based on a result of the estimation process carried out by the processing part, so as to move the workpiece, by correcting a position and posture of the workpiece, to a position where the workpiece is measured by the measuring device, and
the control device further comprises a holding position correcting part configured to cooperate with the measuring device to correct a holding position and posture of the workpiece.

9. The control device according to claim 1, wherein the operating command modifying part is configured to cause the robot to operate based on the center-of-gravity position of the workpiece calculated by the center-of-gravity position calculating part so that the center-of-gravity position of the workpiece is within a predetermined area defined at a position to which the workpiece is conveyed.

* * * * *